B. JANSON.
RECIPROCATING CHURN.
No. 187,864.  Patented Feb. 27, 1877.
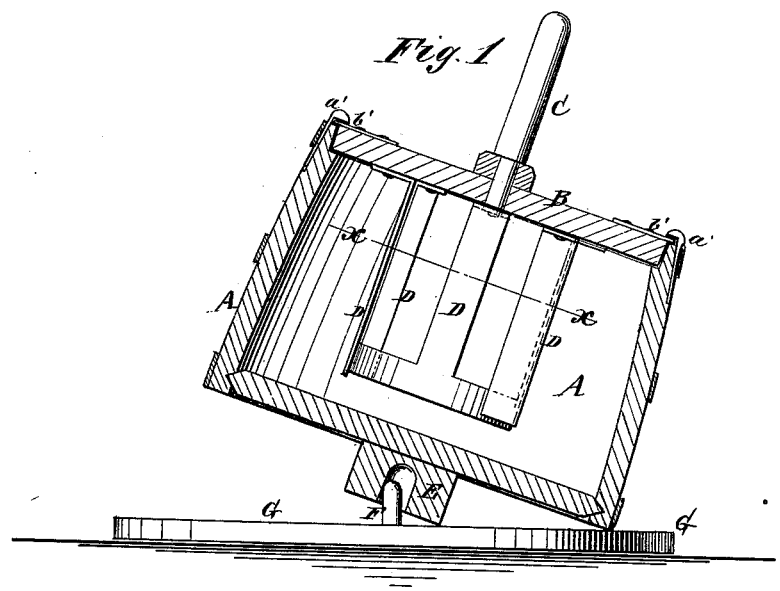
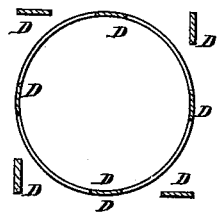
WITNESSES:
A. W. Almgoist
John Goethals
INVENTOR:
B. Janson
BY  mumu
ATTORNEYS.

UNITED STATES PATENT OFFICE.

BERNHARD JANSON, OF EFFINGHAM, ILLINOIS.

IMPROVEMENT IN RECIPROCATING CHURNS.

Specification forming part of Letters Patent No. 187,864, dated February 27, 1877; application filed September 9, 1876.

*To all whom it may concern:*

Be it known that I, BERNHARD JANSON, of Effingham, in the county of Effingham and State of Illinois, have invented a new and useful Improvement in Churns, of which the following is a specification:

Figure 1 is a vertical section of my improved churn. Fig. 2 is a horizontal section of the dasher, taken through the line $x\ x$, Fig. 1.

Similar letters of reference indicate corresponding parts.

The object of this invention is to furnish an improved churn, which may be easily operated, may be easily cleaned, and which will be effective in operation, bringing the butter very quickly, and enabling it to be readily gathered.

The invention consists in a churn-body having a handle and cover attached thereto, and provided with a socket on its lower side, which is adapted to receive a stud or pin on a stationary base-piece or platform, as will be hereinafter more fully described.

A is the body of the churn, which is made slightly tapering, or a little wider at the bottom than at the top. B is the cover, which fits snugly into the mouth of the body A, and has latches $b'$ attached to it, which interlock with catches $a'$, attached to the body A, and which are so formed as to prevent the lid B from turning in one direction, but will allow it to be turned in the other direction to be unfastened and removed. To the center of the cover B is attached a handle, C, as shown in Fig. 1. D is the dasher, which consists of a number of arms, attached at their upper ends to the cover B, and connected at their lower ends by a ring, and another set of arms set at an angle with the ring of the first set, and attached at their upper ends to the cover B. To the center of the bottom of the churn-body A is attached a circular projection, E, in the center of the bottom of which is formed a hole or recess to receive a pin, F, attached to the floor or to a platform, G, prepared for that purpose. The churn-body rests upon the edge of its side and upon the edge of the projection E, and is operated by pushing the handle C around in the arc of a circle, the pin F keeping the churn from getting out of place while being used. This peculiar motion of the churn-body gives motion to the milk and the dasher D, breaks up the currents, cuts the milk, and brings the butter very quickly. After the butter has come the dasher is removed, and the churn-body is moved about slowly. This gathers the butter to the center, so that it may be conveniently taken out.

It will be perceived that the churn-barrel turns on a fixed axis, and receives a rocking or tilting movement to the right and left, by making the recess in the projection of the churn larger than the axis-pin.

Having thus described my invention, I claim as new and desire to secure by Letters Patent—

The churn herein described, consisting of the body A, cover B, handle C, dasher D, socket E, platform G, and pin F, all constructed and relatively arranged to operate as set forth.

BERNHARD JANSON.

Witnesses:
RUFUS C. HANAH,
SOLON C. KEMON.